May 15, 1962   C. G. BELL   3,034,166
HEATED WINDSHIELD WIPER
Filed Jan. 28, 1959

INVENTOR
CURRIE G. BELL
BY
Williamson, Schroeder & Palmatier
ATTORNEYS

United States Patent Office 3,034,166
Patented May 15, 1962

3,034,166
HEATED WINDSHIELD WIPER
Currie G. Bell, Mound, Minn.
(1319 W. 9th St., North Little Rock, Ark.)
Filed Jan. 28, 1959, Ser. No. 789,532
2 Claims. (Cl. 15—250.07)

This invention relates to improvements in automotive windshield wipers and particularly to a heater mechanism for use in combination with conventional windshield wipers during cold winter driving conditions where snow, sleet or freezing of moisture on windshield are encountered.

In many sections of the United States and foreign countries where below-freezing temperatures are common during the winter season, difficulty is experienced in preventing rain, sleet or melted snow from freezing and glazing upon the windshield of an automotive vehicle. Conventional windshield wipers in such conditions will not clear the outer surface of the windshield of the freezing moisture with the result that the driver's vision is seriously impaired and in many instances obstructed. A number of devices have been provided for heating the windshield or the wiper blade per se in an attempt to overcome this difficulty.

The present invention consists in a device readily capable of an attachment or as standard equipment in windshield wiper structure, for heating areas of the windshield as the wiper oscillates, thereby effectively solving the problem inherent with most conventional windshield wipers embodied in automotive cars sold today.

An object of my invention is the provision of highly efficient and extremely simple electric heater structure which may be readily combined with all of the present conventional windshield wipers, applying heat at very close range to the critical areas of an automotive windshield and thereby melting frost, ice and snow to, in combination with the flexible wiper blade, prevent formation of an icy deposit upon the external surface of a windshield.

It is a further object to provide a device of the class described which may readily fit and be attached to windshield wipers of conventional design, furnishing an efficient electrical heating element surrounding the longitudinal sides of the wiper blade in close spaced relation and in operation disposed very closely adjacent to the external windshield surface and movable with the windshield wiper over the critical windshield areas for maintaining clear vision in driving.

Another and more specific object is the provision of an extremely simple electrical heater attachment for windshield wipers of conventional types which may be readily secured to and supported from the reinforced back of a conventional wiper blade through the medium of a plurality of connector elements, each having means for at least partially surrounding and retaining a portion of the electrical heating element to dispose said element in very close working relation to the exterior of the windshield.

A still further object is the provision of a heating attachment for windshield wipers of the class described wherein the said connector elements have smooth terminal surfaces or shoes for contact with and guiding upon the external surface of the windshield to assure the proper, slightly spaced relationship between an elongated and blade-surrounding electrical heating element and the exterior surface of the windshield.

These and other objects and advantages of my invention will more fully appear from the following description made in connection with the accompanying drawings wherein like reference characters refer to similar views and in which.

Figure 2:
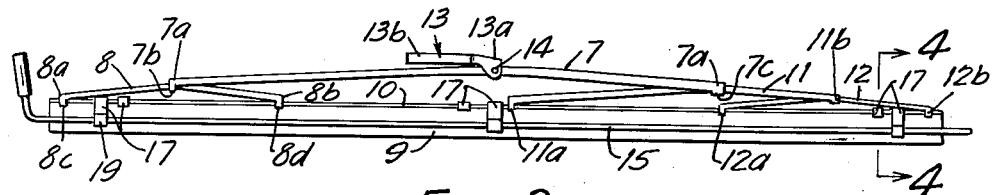
FIG. 2 is a side elevation of a conventional type of windshield wiper with my heater structure mounted thereon.
Figure 4:
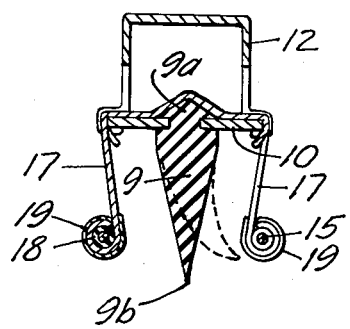
Figure 5:
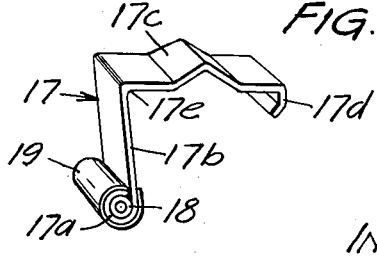

FIG. 4 is a cross section on a larger scale taken along the line 4—4 of FIG. 2; and FIG. 5 is a detail perspective view of one of the several connector elements or saddle clips for detachably connecting the heating element to the reinforced back of the wiper blade and for also serving to engage and properly position the elongated and looped heater element in the desired cooperative position with reference to the wiper blade and external windshield area.

Figure 1:
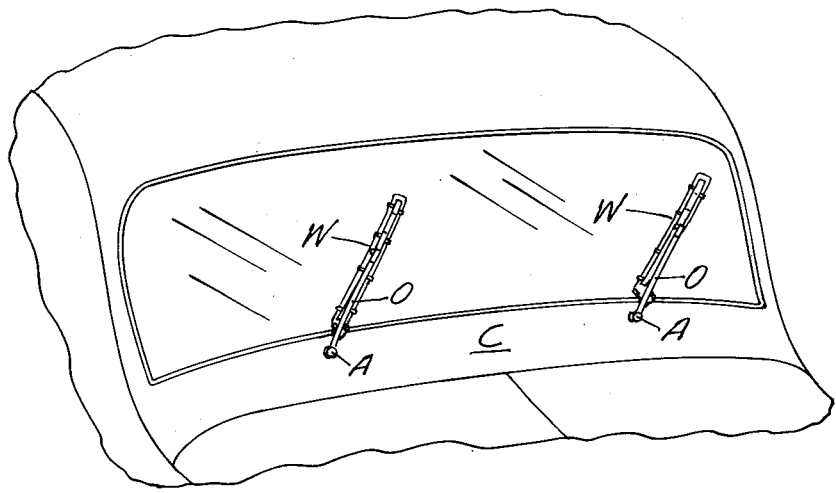
FIG. 1 is a fragmentary perspective view of an automotive windshield having a pair of conventional windshield wipers attached thereto for operation and having my improved heater structures embodied in the conventional windshield wipers.

Referring now to the embodiment of my invention illustrated in the accompanying drawings, my improved structure is illustrated as attached (FIG. 1) to a pair of swinging or oscillatory windshield wiper devices indicated as entireties by the letter W, pivotally mounted for swinging as shown upon the cowl C of the car and swingable across large segmental areas of the windshield generally along the axes A.

Each of the wiper devices W is attached to the outer end of a swingably reciprocating conventional operating arm O. The type of wiper device illustrated is merely exemplary of a number of different windshield wipers conventionally used and as shown, comprises a main pressure frame of channel form 7 bent slightly angularly from its transverse center to afford widely spaced coupling terminals 7a. The inner coupling terminal 7a disposed a short distance from the pivot of the operating arm is connected by a somewhat resilient, slightly bowed "evener" link 8 to the reinforced longitudinal back of a conventional wiper blade 9 at two widely spaced points and adjacent the inner or lower end of the wiper blade. The medial and slightly angularly bent or bowed portion of link 8 is attached and swingably connected with the terminal coupling 7a of channel frame 7 as by inturned ears 7b integrally formed from the side flanges of the channel underlying and engaging the said medial angled portion of the evener link 8. The two ends of evener link 8 designated as 8a and 8b respectively, have inturned ears 8c and 8d respectively which are turned under and are interlocked with a non-corrosive, metal reinforcing strip 10 which is affixed in conventional manner to the widened longitudinal back portion 9a of the wiper blade 9, as shown in FIG. 4.

The outer coupling terminal 7a of the channel frame member 7 is swingably connected by inturned ears 7c with an intermediate, slightly angularly bent portion of an evener link 11 of generally similar structure but longer than link 8. The longer and inner arm of link 11 at its end is provided with inturned ears 11a which underlie and are secured to the reinforcing back strip 10 of the wiper. The outer and shorter arm of the link 11 at its end, is provided with inturned attachment ears 11b which underlie and are swingably connected with the central and slightly angularly bent portion of an auxiliary evener link 12 having its inner end provided with inturned ears 12a for underlying and attachment to an intermediate portion of the reinforcing strip 10 of the wiper blade. The outer end of the auxiliary link 12 is provided with inturned ears 12b which underlie and are attached to the outer end portion of reinforcing strip 10.

The foregoing frame channel and evener link connections are conventional for a number of different windshield wipers extensively used at the present time.

The wiper blade 9 in conventional manner is constructed from pliable or flexible material such as soft rubber, having a thickened back portion 9a and in cross section being beveled at the two longitudinal sides thereof to provide a longitudinal wiper edge 9b in conventional fashion.

As shown, a substantially rigid coupling clip 13 is swingably secured at its outer bifurcated end 13a by a small pin 14 to the central and bent portion of the channel frame 7, said clip having a shank portion 13b which forms a socket for receiving and rigidly attaching to the outer end of the operating arm O.

Figure 3:
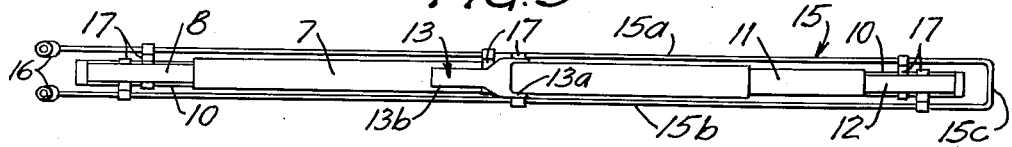
FIG. 3 is a top plan view or front elevation of the same.

My electrical heater unit in its close cooperative relation with the wiper blade 9 and reinforcing strip 10 comprises an elongated, generally U-shaped electrical heating element 15 preferably but not necessarily constructed of a suitable stiff but resilient resistance wire shaped to surround in close spaced relation, the longitudinal sides and as shown the outer end of the wiper blade 9 and lying generally in a plane intermediate of the height of the wiper blade (see FIG. 4) but more particularly being disposed in a plane slightly outward of the deformed contact surface of the edge of wiper blade 9 as indicated by dotted lines in FIG. 4 as it operates upon the windshield. The size of the U-shaped resistant wire is preferably #19 gauge since resistance wire of this particular size is of sufficient rigidity to maintain its shape during the operation of the wiper and is also of sufficient flexibility to accommodate curved windshields. Thus, the heating element 15 has substantially straight longitudinal side legs 15a and 15b extending preferably the full length of wiper blade 9 and disposed in parallel closely spaced relation to the longitudinal beveled portion of that blade. In the embodiment shown the heating element 15 has an integral short interconnecting portion 15c which surrounds and is spaced from the outer end of blade 9 although it will of course be understood that in lieu of the integral interconnection of the side portions 15a and 15b, two wires or element sections may be employed electrically interconnected by an arched or interconnecting medium. The inner ends of the side sections 15a and 15b of the heating element are shaped to converge as shown in FIG. 3 and have attached thereto small electrical plug elements 16 which are disposed in close side-by-side relation for electrical connection with suitable socket elements which extend through the cowl or other supporting medium on the car for the operating arms and which are disposed flexibly along axes closely parallel to the pivot A for the operating arm.

The entire heating element 15 is attached to and supported from the reinforced back of the wiper blade in the embodiment of my invention illustrated by a plurality of connector elements which preferably are in the form of resilient saddle clips 17 shaped as illustrated in FIGS. 4 and 5, in the general configuration of the numeral 7 and having tubular or semi-tubular insulated sockets 17a at the ends of the stems 17b thereof, the socket of each clip extending longitudinally of the wiper blade 9 and at least partially surrounding a portion of the heating element 15.

Saddle clips 17 may be constructed from tough highly resilient plastic material which has insulating qualities and which in the integral formation of the wire-receiving sockets 17a, present a very slippery rounded exterior surface which forms a riding shoe for actually engaging the exterior surface of the windshield during operation. The saddle clips 17 may also be constructed of resilient, non-corrosive metal such as bronze in which case as shown in FIG. 4, a rubber or other dielectric tubular insert 18 is employed interiorly of the socket 17a to surround and insulate the engaged portion of the heating element. Where the saddle clips are made of metal it is desirable to coat the external or riding surfaces of the combination sockets and riding shoes with a layer of very slippery tough material such as Teflon, indicated at 19 in FIG. 4.

Each saddle clip 17 is provided with the top or outer attachment portion 17c which is adapted to closely fit the enlarged back edge of the wiper blade 9 together with the outer planar surfaces of the metal reinforcing strip 10 for the blade. Said attachment portion terminates in a downwardly and slightly inwardly angled retaining flange 17d for underlying one longitudinal edge of the reinforcing strip 10. The stem portion 17b of each clip it will be noted, is angled acutely to the top portion 17c (the angle as shown approximating 60 degrees before the clip is applied) thereby forming an apex retaining portion 17e for engaging the opposite longitudinal edge of the reinforcing strip 10 and also positioning the inwardly extending or socket-shoe end of the clip to be positioned in close spaced relation from one of the beveled longitudinal sides of the blade 9.

In the form of my invention illustrated, the several saddle clips 17 are of identical construction for application to either right or left longitudinal sides of the wiper blade and as shown six of said clips are employed to properly and accurately attach and position the entire heating element in operative position although it will of course be understood that more of said clips may be employed or that connector elements of equivalent structure may be used, all within the scope of my invention. As shown, three of said clips are positioned with the stem portions 17b thereof disposed at one longitudinal side of the wiper blade while three more of said clips have their stems disposed at the opposite longitudinal side of the blade as shown in FIGS. 2 and 3, it being desirable that a pair of oppositely disposed saddle clips support and connect the outer looped portion of the unitary heater element with the outer end portion of the wiper blade while another pair of oppositely disposed clips connect and secure end portions of the heater element adjacent the plug members 16 with the inner end portion of the wiper blade. It is also desirable that the intermediate or central portions of the two sections 15a and 15b of the heater element be attached to the central portion of the wiper blade by two oppositely disposed clips.

It will be understood that in forming and contouring the heater element 15, the requisite number of clips 17 with the top portions 17c appropriately directed, are slid upon the appropriate wire sections 15a and 15b before the plug elements 16 are attached whereby the heating unit may thereafter be readily and detachably secured to the reinforced longitudinal back of the wiper blade by springing the flanges 17d and stem portion 17b of the clips to cause the retaining portions to properly engage and underlie the longitudinal edges of the metal reinforcing strip 10 of the wiper blade.

With the simple and efficient connector media described, the resistance or heating element 15 particularly if constructed from relatively stiff wire, may be precisely positioned in the desired relation illustrated and described, with reference to the deformable edge of the blade and guided by the rounded shoes 17a in very close spaced relation to the external surface of the windshield.

The electrical plug terminals 16 are usually connected in series with a storage battery circuit although of course a grounded circuit may be employed if desired.

In operation the heated windshield wiper structure is swingably reciprocated across an area of the exterior of the windshield with the flexible edged portion 9b of the wiper blade engaging the windshield and being deformed by the swinging action to a position substantially as shown in the dotted lines of FIG. 4. The rounded and smooth riding shoes 17a of the several saddle clips also engage the external surface of the windshield smoothly riding thereover and in combination maintaining the electric heating element 15 substantially in a plane disposed very closely adjacent the windshield surface, the spaced distance of the longitudinal legs 15a and 15b of the heating element from the windshield surface in the preferred embodiments of my invention approximating $\frac{1}{32}$ of an inch. Thus, in the travel of the wiper heat is directly applied to said windshield surface and of course to snow, moisture or any accumulations of frozen material on said windshield area. The result of said direct application of heat at both longitudinal sides of the wiper blade with the wiping function of the deformed blade edge, is that no accumulations, coatings or deposits of frost, or ice glaze are possible on the said area of the windshield in even severe freezing weather conditions.

My improved structure is particularly adapted as an attachment for various types of conventional windshield wipers now employed but of course may be embodied as standard equipment in windshield wipers supplied by automotive manufacturers.

It will be apparent from the foregoing description that the heating unit of my structure may be quickly attached or detached to and from windshield wipers without the use of tools by merely springing the retaining portions of the saddle clips for engagement or disengagement with the longitudinal edges of the reinforcing strip 10 of the wiper blade.

It will of course be understood that various changes may be made in the form, details, arrangement and proportions of the parts without departing from the scope of my invention which consists of the matter shown and described herein and set forth in the appended claims.

What is claimed is:

1. A heater attachment for windshield wipers of conventional types which have an elongated wiper-blade-holder and a wiper blade resiliently connected therewith and having a reinforced longitudinal back and a laterally flexible free wiping edge, said attachment comprising an elongate electrical heating element shaped to surround at least the longitudinal sides of said blade in close spaced relation thereto and connector means for detachably supporting said heating element from the reinforced back of said wiper blade with the main portions of said heater element lying substantially in a plane intersecting the laterally flexible free wiping edge of said blade and in very close but spaced relation to the external surface of the windshield, said connector means comprising a plurality of detachable saddle clips, one set of which are disposed with shank portions extending along and in close parallel relationship to one longitudinal side of said wiper blade and a second series of which are disposed in similar relation to the opposite longitudinal side of said wiper blade, said clips terminating in smooth riding surfaces for engagement with the external side of the windshield.

2. The structure set forth in claim 1, the terminals of said clips in addition to providing said smooth riding surfaces constituting retainer elements for engaging portions of said electrical heating element.

References Cited in the file of this patent

UNITED STATES PATENTS

| | | |
|---|---|---|
| 1,980,590 | Knight | Nov. 13, 1934 |
| 2,322,312 | Osborn | June 22, 1943 |
| 2,416,572 | Cordova | Feb. 25, 1947 |
| 2,627,011 | Eaves | Jan. 27, 1953 |
| 2,656,448 | Lentz | Oct. 20, 1953 |
| 2,786,224 | Dembosky | Mar. 26, 1957 |
| 2,790,194 | Norine | Apr. 30, 1957 |
| 2,910,715 | Ohrt | Nov. 3, 1959 |